May 29, 1934.   D. K. WARNER   1,960,764
DEVICE FOR UTILIZING AND DISTRIBUTING FROZEN BRINE
Filed Feb. 6, 1930
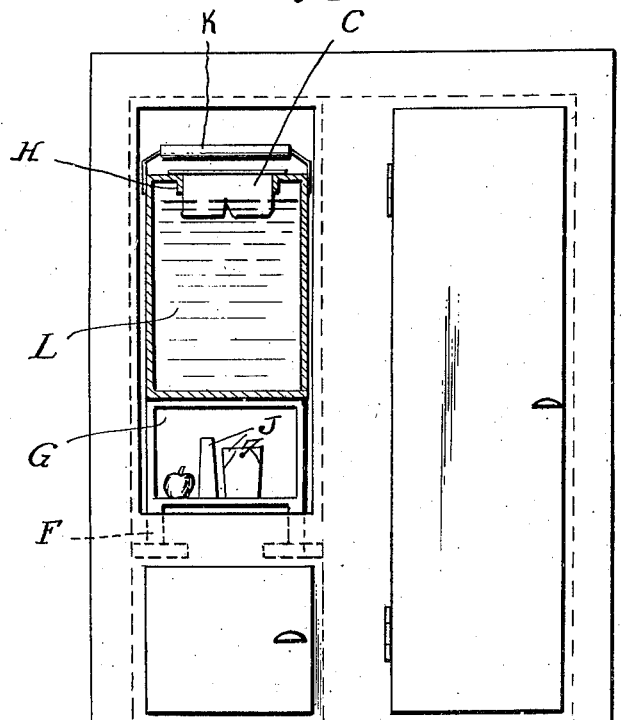
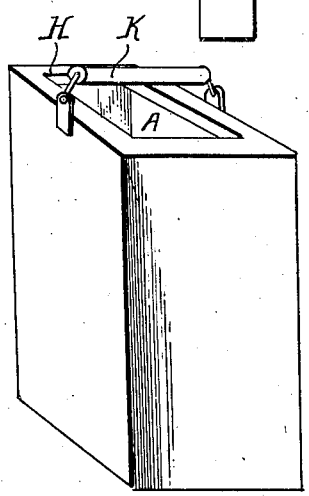
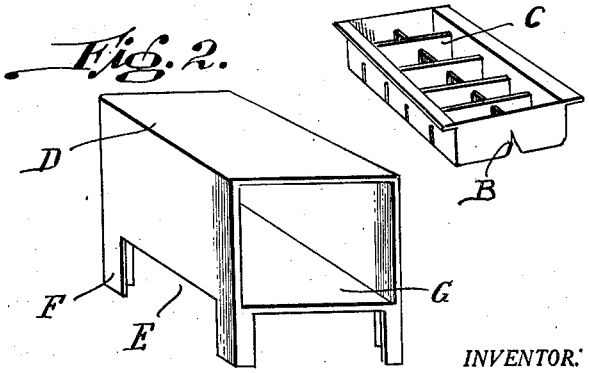
INVENTOR.
Douglas K. Warner Patented May 29, 1934

1,960,764

UNITED STATES PATENT OFFICE 1,960,764

DEVICE FOR UTILIZING AND DISTRIBUTING FROZEN BRINE

Douglas Kent Warner, Watkins Glen, N. Y.

Application February 6, 1930, Serial No. 426,319

7 Claims. (Cl. 62—69)

This invention relates to means for cooling small ice boxes to a lower temperature than is possible with ice, without changing the box or installing refrigerating equipment. It also furnishes a special compartment for holding frozen products, and, in addition, facilities for very rapidly freezing ice cubes. It utilizes a frozen brine solution for which Patent No. 1,884,428 issued Oct. 25, 1932.

It is highly desirable to hold all food as close as possible to the freezing point with ample safety factor to prevent the possibility of occasionally freezing and thawing. The frozen brine pail holds a constant temperature while automatic machines must be set at a comparatively high temperature to offset possibilities of freezing the food as the temperature varies so between stops and seasons, as well as with the thickness of frost on the unit. In practise therefore, most machines are set at a temperature from 10 to 15 degs. above freezing. It is also extremely important that the humidity shall not vary. Many automatic refrigerators impose violent humidity fluctuations, these being especially apparent in small household refrigerators using a small amount of heavily frost-coated refrigerating surface. The very low temperature when the machine operates dries the air and the food until the door opens and covers the food with condensed air moisture again, or until the machine stops and the food begins to hold the box temperature down.

It is also very desirable to get ice cubes in a hurry for special occasions and the ordinary four-hour wait necessary when cooling by air in the ordinary refrigerator is prohibitive.

Most food, if frozen at the source, can be brought to the market in far better state than by the usual methods. This requires that it be put in a freezing compartment on arrival at a store or when brought home. A large space unhampered by ice-cube trays is accordingly provided for ice cream, frozen fruit, fish or cuts of meat, the top of this space being in direct contact with the frozen brine and its sides and ends directly chilled by air just leaving the sides of the frozen brine pail. When a cake of ice melts, its surface decreases and the ice box temperature rises. As the frozen brine melts, the temperature of its mass remains constant as well as the surface of the pail holding it. Since the pail is changed every two days and replaced with an unfrosted pail, the temperature and humidity of the box remain absolutely constant except during door-openings, on which score the small-door ice box is not as serious an offender as the single-door mechanical refrigerator. The cost of equipping ice boxes for the use of frozen brine is ½ of 1% the cost of equipping them for mechanical refrigeration. The frozen brine introduces no deathly hazard such as sulphur dioxide, ammonia, methyl and ethyl chloride as are used in mechanical refrigerators. It does not impose a demand charge for winter service if not used in the winter.

The efficiency of freezing brine for the ice boxes is over 10 times better than the efficiency of producing poor quality refrigeration in a household box. True there is an expansive labor element in bringing frozen brine to the box, but this may be offset by letting the ice man deliver ice cream and frozen products as well as the pail of frozen brine. The cost of delivering frozen brine is less than that of ice delivery for there are more cold units per pound, but more particularly because food can not be stored in the ice box ice chamber as is customary when ice becomes partly melted. The delivery man has merely to take out the old pail and slip in the new with its tray of cubes frozen clear at the plant with de-aerated water. Also he does not have to carry dripping ice over the floor or set one piece down when he arranges the food and splits up the ice left in the box. Also there is no drip pan for the housewife to empty, nor a hole in the bottom of the box to drain out all the cold air. When the ice cubes sent from the factory are melted, more can be made in a few minutes by filling the cube pan with water and re-submerging in the frozen brine.

Fig. 1 shows an ice box arranged with frozen brine pail and freezing compartment. Fig. 2 shows the freezing compartment, Fig. 3 the frozen brine pail and Fig. 4 the ice cube tray divided by fixed partitions, and a deep groove B thru the centre to give the cold access to both sides of the cubes.

The pail Fig. 3 is preferably rectangular as shown slightly smaller than a 50 lb. cake of artificial ice. A band H surrounds the top to prevent slopping and also to hold the ice-cube tray in position. A handle K provides means for carrying the pail.

In the pan Fig. 4, the dividing partitions extend higher than the indentation at the center B, and should protrude above the surface of the ice so that the dividing partition C may be thawed from all four edges. These partitions are soldered tightly to the pan to decrease the freezing and thawing time and to prevent loss of the partitions. Brine circulates in B cooling both its sides.

In the freezing cabinet, Fig. 2, G shows the inside or freezing space D the top on which the brine pail rests, F the legs which hold it up to permit air to circulate thru E and down the usual opening under the ice in a box to the compartment below.

These three parts shown assembled in the ice chamber of a standard box Fig. 1 constitute the total requirement for all the benefits to be derived from frozen brine. The pail may be used alone or with either the freezing compartment or the cube freezer, or both.

With it the housewife may always keep on hand ice cream, frozen fruit ripened with all the luscious flavor nature permits by its own methods of ripening, fish cleaned and frozen as soon as caught on the deep sea and not crushed and warmed for two weeks by tons of other fish dumped on top of it, choicest cuts of meat which butchers can not afford to keep with present refrigerating methods, and all bought right from the counter of the package grocery store with a freezing cabinet counter, held at a constant temperature and humidity by the most efficient of all refrigerating means, that is—frozen brine.

I claim:—

1. A sharp freezing unit for refrigerators comprising a can having an open top and adapted to receive brine ice, a sharp freezing container removably suspended from the top edges of said can, a wall of said sharp freezing container being in direct heat exchange with the brine ice in said can.

2. A sharp freezing unit for domestic refrigerators comprising a can having an open top and adapted to receive brine ice, a flange extending inwardly at the top of the can to partially close said open top, and a freezing container suspended from said top flange.

3. A sharp freezing unit for domestic refrigerators comprising a can having an open top and adapted to receive brine ice, a flange extending inwardly at the top of the can to partially close said open top, and a sharp freezing container forming a closure for the can when suspended from said flange.

4. A sharp freezing unit for domestic refrigerators comprising a can having an open top and adapted to receive brine ice, a flange extending inwardly at the top of the can to partially close said open top, and a sharp freezing container forming a closure for the can when suspended from said flange, and a wall of said sharp freezing container being in direct contact with the brine ice in said can.

5. In a refrigerator, a cold compartment, said compartment including a food chamber, a can adapted to receive brine ice and supported by said chamber, an ice tray supported by the said can, said chamber having a wall in direct heat exchange with the can, and said tray having a wall in direct heat exchange with the brine ice in said can.

6. In a refrigerator, a cold compartment, said compartment including a food chamber, a can adapted to receive brine ice and supported by said chamber, an ice tray supported by the said can, said chamber having a wall in direct heat exchange with the can, and said tray having a wall in direct heat exchange with the brine ice in said can and a second compartment communicating with said first mentioned compartment.

7. In a refrigerator, a cold compartment, said compartment including a food chamber, a can adapted to receive brine ice and supported by said chamber, an ice tray supported by the said can, said chamber having a wall in direct heat exchange with the can, and said tray having a wall in direct heat exchange with the brine ice in said can, the chamber, can and tray being removable from the cold compartment.

DOUGLAS KENT WARNER.